United States Patent [19]

Johnson et al.

[11] Patent Number: 5,439,658
[45] Date of Patent: Aug. 8, 1995

[54] REGENERABLE MAGNESIUM DRY SCRUBBING

[75] Inventors: Dennis W. Johnson, Barberton; Gerald T. Amrhein, Louisville; Robert B. Myers, Akron; Peter VanSmith, N. Canton; William Downs, Alliance, all of Ohio

[73] Assignee: The Babcock & Wilcox Company, New Orleans, La.

[21] Appl. No.: 263,120

[22] Filed: Jun. 21, 1994

Related U.S. Application Data

[62] Division of Ser. No. 116,306, Sep. 3, 1993.

[51] Int. Cl.[6] .......................... B01J 8/00; C01B 21/00
[52] U.S. Cl. ......................... 423/243.07; 423/243.11; 423/244.07; 422/171; 422/172
[58] Field of Search ..................... 422/171–172, 422/161; 110/345, 215-26; 423/244.07, 244.08, 243.11, 638, 541.1, 168, 243.07

[56] References Cited

U.S. PATENT DOCUMENTS

| | | | |
|---|---|---|---|
| 4,246,245 | 1/1981 | Abrams et al. | 423/242 |
| 4,388,283 | 6/1983 | Abrams et al. | 423/242 |
| 4,472,364 | 9/1984 | Bauerle et al. | 423/242 |
| 4,623,523 | 11/1986 | Abrams et al. | 423/242 |
| 4,788,047 | 11/1988 | Hämälä et al. | 423/244.07 |
| 4,915,920 | 4/1990 | Kobayashi | 423/244.07 |
| 5,002,742 | 3/1991 | Lussier et al. | 423/244.07 |
| 5,284,637 | 2/1994 | Merritt et al. | 423/244.07 |

OTHER PUBLICATIONS

B&W Proposal No. 92-195, "Development of Advanced, Dry, $SO_x$/$NO_x$ Emission Control Technologies for High Sulfur Coal", Ohio Coal Development Office, Sep. 10, 1992.

B. Zane Egan and L. Kevin Felker, "Removal of $SO_2$ from Simulated Flue Gas by Magnesia Spray Absorption: Parameters Affecting Removal Efficiency and Products," Ind. Eng. Chem. Des. Dev., 1986, 25, pp. 558–561.

T. A. Burnett and W. L. Wells, "Conceptual Design and Economics of an Improved Magnesium Oxide Flue Gas Desulfurization Process" Ch. 18 of Flue Gas Disulfurization by J. L. Hudson and G. T. Rochelle, editors; American Chemical Society: Wash., D.C. 1982, pp. 381–411.

Special $SO_2$ Report, Power, Mar., 1993, pp. 28, 32, 34.

G. T. Rochelle and D. R. Owens, "Sulfite Oxidation Inhibition by Thiosulfate," Proceedings of the First International Conference on Processing and Utilization of High Sulfur Coal, Colombus, Ohio, Oct. 13–17, 1985.

Primary Examiner—Robert J. Warden
Assistant Examiner—Hien Tran
Attorney, Agent, or Firm—Daniel S. Kalka; Robert J. Edwards

[57] ABSTRACT

A method for cleaning a flue gas containing flyash, sulfur dioxide and other contaminants includes providing a slurry source having a slurry of primarily water, magnesium sulfite and magnesium hydroxide along with small quantities of magnesium sulfate and magnesium chloride. The flyash is first removed from the flue gas and the flue gas is sprayed with the slurry for forming reaction products in the flue gas. The reaction products are then collected from the flue gas and a first portion of the reaction products is provided to the slurry source. A remaining portion of the reaction products is heated for decomposing into sulfur dioxide and magnesium oxide. The magnesium oxide is then provided to the slurry source. Magnesium sulfate and magnesium chloride are purged from the slurry source.

6 Claims, 2 Drawing Sheets

REGENERABLE MAGNESIUM DRY SCRUBBING

This is a division of application Ser. No. 08/116,306, filed Sep. 3, 1993.

BACKGROUND OF THE INVENTION

1. Field of the Invention

The present invention relates in general to cleaning a flue gas and in particular to a new and useful method and system for cleaning flue gas by regenerable magnesium dry scrubbing.

2. Description of the Related Art

In the power plant field, it is known to use a regenerable magnesium oxide process in either a dry or wet scrubber in order to remove contaminants from a flue gas. In this process, it is known that flyash and chlorides are contaminates that prevent the economic recycle of the magnesium values for reuse. It is well known to remove flyash prior to contaminant scrubbing and chlorides can be removed with a purge liquid.

U.S. Pat. No. 4,246,245 to Abrams, et al. discloses a side stream containing magnesium sulfite-bisulfite which is oxidized to sulfate and magnesium sulfate which is converted to magnesium hydroxide. This reference describes the use of a type S dolomitic lime which contains about 55% calcium hydroxide, 40% magnesium hydroxide, 2% magnesium oxide, and 0.2% water. This reference does not disclose oxidation inhibition, but rather, the product (magnesium sulfite) is oxidized to produce magnesium sulfate which, in turn, is returned to a reaction zone.

U.S. Pat. No. 4,388,238 to Abrams, et al. describes how sulfur dioxide is contacted with a magnesium sulfite solution in a scrubbing zone at a pH in the range of about 6 to 7.5 in order to produce magnesium bisulfite. It also teaches providing a minor regeneration stream which is subjected to oxidation to oxidize bisulfite and sulfite to sulfate. This reference also teaches the use of a type S hydrated dolomitic lime for the spray dryer at a weight percent of 3–15% suspended solids and at a stoichiometric ratio of 1.1 to 1.5 and injected at a temperature of 145° to 165° F. The product is calcium sulfite and sulfate, magnesium sulfite and sulfate, unreacted lime, and flyash. However, the presence of calcium sulfite and sulfate and magnesium sulfate is undesirable.

U.S. Pat. No. 4,623,523 to Abrams, et al. also teaches the use of hydrated dolomitic lime. This reference discloses the use of a confined zone within a flue gas stream to reduce sulfur dioxide by 10–90%. This reference does not provide for operating at $SO_2$ removal rate higher than 90% and does not teach a method which uses a regenerable reagent, produces a salable product, and produces a small waste stream.

U.S. Pat. No. 4,472,364 to Bauerle, et al. teaches the use of dry scrubbing magnesium oxide. This reference does not teach the use of oxidation inhibition, chloride purge, magnesium sulfite internal recycle to a dry scrubber, and a slipstream treatment for chloride and sulfate removal. This reference teaches the production of a waste product and oxidation of the sulfite, not a suppression of oxidation.

SUMMARY OF THE INVENTION

The present invention pertains to a dry scrubbing process for cleaning a flue gas using regenerable magnesium compounds wherein the flue gas contains flyash and sulfur dioxide contaminants. The flyash in the flue gas is first removed from the flue gas and the flue gas is sprayed with a slurry which forms a reaction product in the flue gas. The method comprises providing a slurry source having a slurry comprising primarily water, magnesium sulfite, magnesium hydroxide, but will also contain small quantities of magnesium sulfate and magnesium chloride depending upon the removal rates of $SO_3$ and HCl and the oxidation rate of $SO_3^{-2}$ to $SO_4^{-2}$. The reaction product is then collected from the flue gas and a portion of the reaction product is provided to the slurry source. The remaining portion of the reaction product is heated in order to decompose into sulfur dioxide and magnesium oxide. Magnesium sulfate and magnesium chloride that are present are unaffected by heating at the temperature used to decompose magnesium sulfite. The magnesium oxide, magnesium sulfate and magnesium chloride is then provided to the slurry source. An oxidation inhibitor is also used in conjunction with the slurry source. Both magnesium sulfate and magnesium chloride are purged from the system in a purge stream.

The present invention provides for a regenerable magnesium oxide process using magnesium oxide as the scrubbing reagent to remove $SO_2$ in a scrubber. A portion of the resulting magnesium sulfite ($MgSO_3$) is heated to remove $SO_2$ and recover magnesium oxide (MgO). The rest of the resulting $MgSO_3$ is also used as scrubbing reagent to remove $SO_2$. The recovered MgO is recycled back to the scrubber. In order to make up for any MgO losses, fresh MgO is also added to the scrubber. The $SO_2$ produced is processed into a salable product, such as sulfuric acid or sulfur in known commercial processes.

It is an object of the present invention to use oxidation inhibitors in order to retard the formation of sulfates in a dry $SO_2$ absorber and to maximize sulfite ($SO_3^{-2}$) and minimize sulfate ($SO_4^{-2}$) formation because sulfates require more energy to release $SO_2$ than sulfites which allows the present invention to require significantly less energy than the known system.

It is another object of the present invention to purge chlorides from this process from the feed system rather than through the use of a hydrogen chloride prescrubber prior to spray drying in order to decrease both capital cost of the unit and the pressure drop of the flue gas path by eliminating a gas side process step.

It is another object of the present invention to recycle recovered solids in order to increase the dissolved alkalinity of in the spray dryer feed for achieving the maximum $SO_2$ removal.

It is another object of the present invention to use a small slipstream sulfate and chloride removal step in order to purge the system of sulfates and chlorides after the magnesium solids have been regenerated and slaked.

It is another object of the present invention to remove HCl, $SO_3$, and other acid gases along with solid particulate in the form of flyash and reaction products. Air toxics, such as mercury, volatile organics, or heavy metals that exist as gases, condensable vapor, or particulates are also removed by the system.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
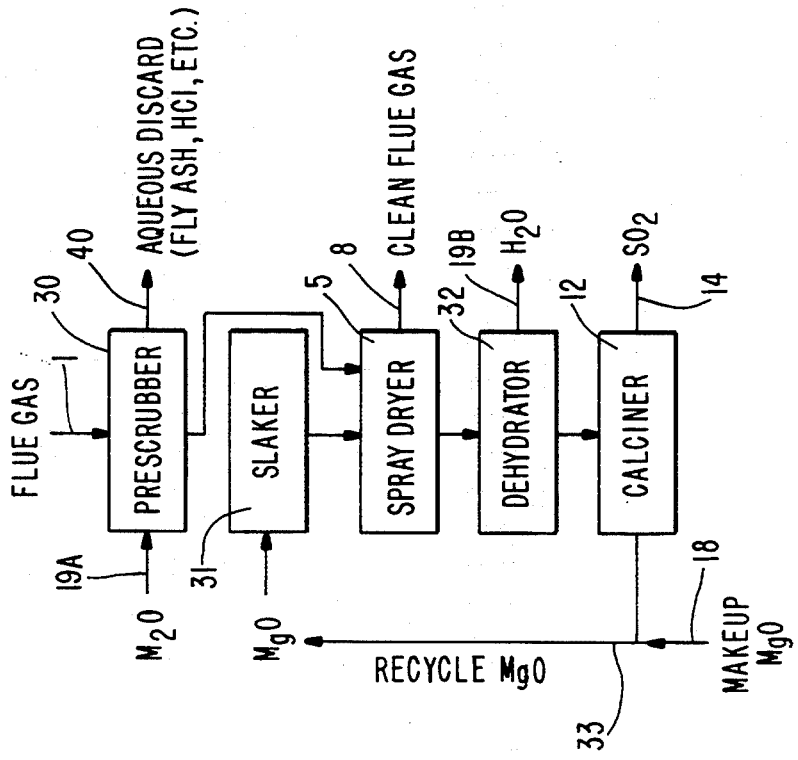
FIG. 1 is a schematic illustration of a known system for cleaning a flue gas using a magnesium oxide dry scrubber.

FIG. 1 illustrates a known magnesium scrubber system for dry flue gas desulfurization which uses a prescrubber 30 for cleaning a dirty flue gas stream 1 in order to remove contaminants from the flue gas stream 1. The prescrubber 30 uses water stream 19a and produces an aqueous discharge stream 40 comprising flyash, magnesium chloride and other contaminants. The flue gas is then channeled from the prescrubber 30 to a spray dryer 5 which produces a clean flue gas stream 8. The spray dryer 5 communicates with a magnesium oxide slaker 31 for providing magnesium to the spray dryer 5. A dehydrator 32 communicates with the spray dryer 5 for dehydrating the reaction product produced in the spray dryer 5. Water stream 19b is also produced by the dehydrator 32. A calciner 12 communicates with the dehydrator 32 for decomposing the reaction product into sulfur dioxide stream 14. Magnesium oxide from the calciner 12 is recycled by a recycle stream 33 back to the slaker 31. Make-up magnesium oxide stream 18 is also added to the recycle stream 33.

Figure 2:
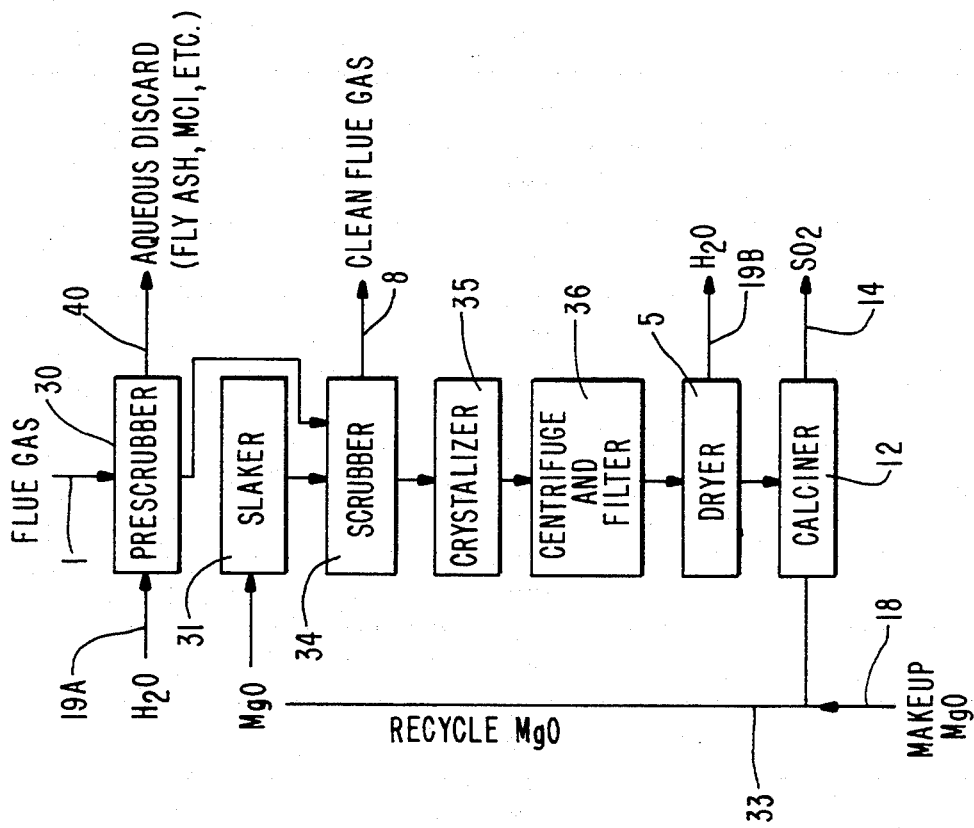
FIG. 2 is a schematic illustration of a known system for cleaning a flue gas using a magnesium oxide wet scrubber.

FIG. 2 illustrates a second known system utilizing magnesium oxide for desulfurizing flue gas. The system of FIG. 2 is similar to the system illustrated in FIG. 1 except that a scrubber 34 rather than a spray dryer 5 communicates with the prescrubber 30 for producing a clean flue gas stream 8. The reaction product from the wet scrubber 34 is channeled to a crystallizer 35, which in turn communicates with a centrifuge and a filter unit 36. A dryer 5 receives the product from the unit 36 for channeling to the calciner 12.

For the present invention, the same reference numerals are used to designate the same or functionally similar parts as described for the known system mentioned above.

The purpose of the present invention is to provide an improved magnesium oxide-based dry scrubbing process by using oxidation inhibitors, scrubber recycle of magnesium sulfite crystals, and slipstream removal of magnesium sulfate and magnesium chloride.

Figure 3:
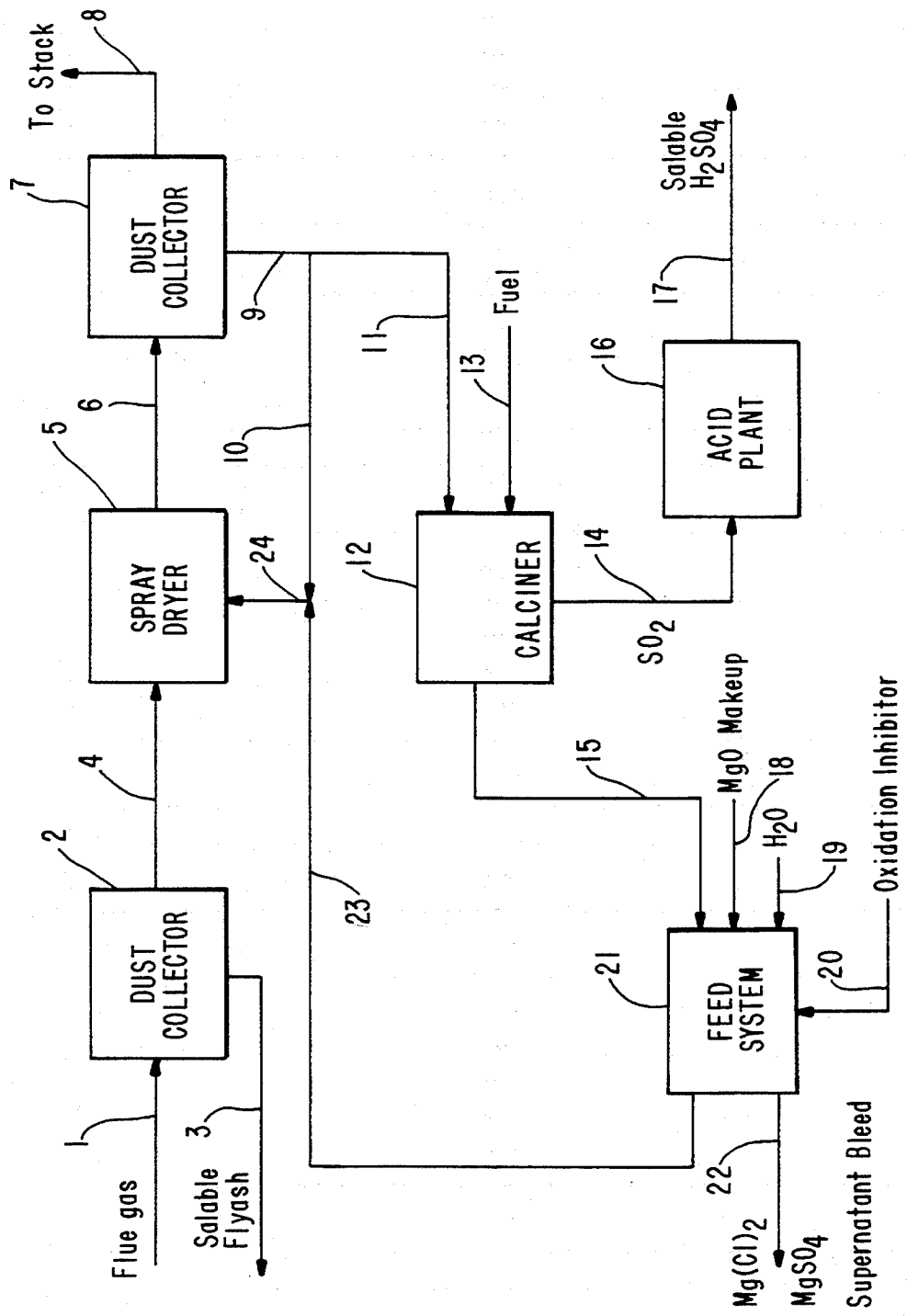
FIG. 3 is a schematic illustration of a system for cleaning a flue gas according to the present invention i.e., using magnesium oxide in a dry scrubber.

According to the present invention, as shown in FIG. 3, the dirty flue gas stream 1 enters a dust collector 2 that removes the flyash stream 3 from the flue gas stream 1 for disposal or sale. It is important to the process that nearly all of the flyash stream 3 be removed since flyash is an unwanted compound in the process. The dust collector 2 is a device known in this art such as an electrostatic precipitator or a baghouse.

Dustless flue gas stream 4 then enters a spray dryer 5 where $SO_2$ is removed by contact with a slurry stream 24 comprising water, magnesium sulfite ($MgSO_3$), magnesium hydroxide ($Mg(OH)_2$), magnesium sulfate ($MgSO_4$), and magnesium chloride ($MgCl_2$). In addition, $SO_3$ or HCl gas that is present in substantially dustless flue gas stream 4 is substantially removed. These react with $Mg(OH)_2$ to form the magnesium sulfate and magnesium chloride in the slurry. The reaction sequence is:

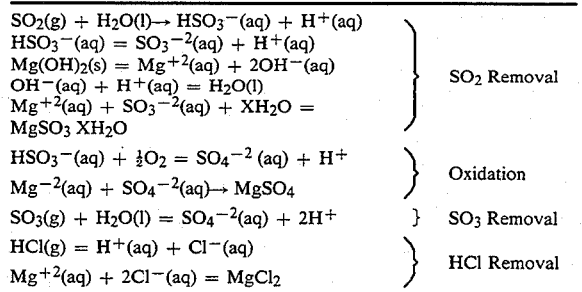

The slurry is atomized in the spray dryer 5 by an atomizer for example a mechanical or two-fluid atomizer. The slurry also cools the flue gas by the vaporization of water as the flue gas is cooled typically from about 300° F. to about 150° F. The dried solids contain small amounts of residual free water.

Particulate-laden flue gas stream 6 flows from the spray dryer 5 to a second dust collector 7 where the particulates containing magnesium sulfite and magnesium hydroxide, along with small quantities of magnesium sulfate and magnesium chloride are filtered from the flue gas. The cleaned flue gas then leaves the plant via a stack 8. A portion (stream 11) of the recovered solids 9 are sent to a calciner 12 such as a fluid bed calciner, for regeneration and a portion (stream 10) are recycled back to the spray dryer 5. Stream 10 is returned to the spray dryer 5 to provide water soluble sulfite compounds in the spray dryer 5. Most of the sulfur dioxide removal takes place when the injected slurry is still wet due to the more efficient mass transfer between gas and liquids when compared to gas and solids. Magnesium sulfite is soluble and will react with sulfur dioxide prior to being dried, while the magnesium oxide is very insoluble and will provide very little liquid phase sulfur dioxide removal.

A portion (stream 11) of stream 9 solids recovered from the duct collector 7 are heated in a calciner 12 to about 800° F. in order to decompose magnesium sulfite by the reaction:

This heating also evaporates any residual water in the solids. The sulfur dioxide 14 and water are sent to a sulfuric acid plant 16. The solids (stream 15) from the calciner 12 comprise primarily magnesium oxide, along with a small amount of magnesium sulfate and magnesium chloride. The temperature of the calciner 12 is too low to decompose the magnesium sulfate.

The sulfur dioxide and water (stream 14) from the calciner 12 are sent to a sulfuric acid plant 16 that oxidizes the sulfur dioxide to sulfur trioxide and then absorbs the sulfur trioxide into water to make sulfuric acid (stream 17) for sale by reaction:

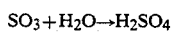

The small amount of water in the sulfur dioxide stream to the sulfuric acid plant 16 does not adversely affect this process step.

The solids 15 from the calciner 12 are then sent to a feed system 21 where they are slurried with water 19. Oxidation inhibitors 20 are added to the feed system 21. Makeup magnesium oxide 18 is added to the feed system 21 where it is converted to $Mg(OH)_2$. The feed system 21 consists of known slaking equipment, pumps, tanks, etc. necessary to deliver the reagent to the spray dryer. Magnesium oxide 18 is a commercially available compound that is produced from sea water. The magnesium chloride and magnesium sulfate can be removed at this step by purging supernatant liquid stream 22 from the slurry. Magnesium sulfate and magnesium chloride are more soluble than magnesium hydroxide so that magnesium hydroxide stream 23 will not be purged from the system at this step, only the undesired compounds, i.e. magnesium sulfate and magnesium chloride are purged. The slaked magnesium hydroxide 23 is then sent to the spray dryer 5. Magnesium oxide is recovered from purge $MgCl_2$ by reaction with slaked lime or other alkalis such as soda ash ($Na_2CO_3$) or caustic NaOH via:

$$MgCl_2 + Ca(OH)_2 \rightarrow Mg(OH)_2 \downarrow + CaCl_2$$

The slurry 24 is made up of solids from the baghouse 7 and from recycle magnesium hydroxide (stream 23) from the feed system 21. The slurry also contains a small amount of oxidation inhibitor 20 added to the feed system 21. Examples of oxidation inhibitors are thiosulfate ion, sulfur, colloidal sulfur, and other sulfur compounds. Also other compounds such as formate, certain metals, etc. are known to inhibit oxidation in an aqueous system. Thiosulfate ion is a preferred oxidation inhibitor because it is readily formed by addition of colloidal sulfur to water and has been effective in oxidation inhibition in wet sulfur dioxide scrubbers. A concentration of 100–5000 ppm would be typical depending upon parameters which affect the natural oxidation such as flue gas $O_2$ content, etc. Other antioxidants include 4-aminophenol, methol, phenol, 1,10-phenathroline, ETDA (ethylenediaminetetraacetic acid), hydroquinone, and gallic acid at the same concentration range as thiosulfate. The oxidation inhibitors 20 inhibit the sulfite compounds from oxidizing to sulfate compounds by the unwanted reaction:

$$MgSO_3 + \tfrac{1}{2}O_2 \rightarrow MgSO_4$$

Oxidation inhibition is important because regeneration of Magnesium sulfate (to MgO and $SO_2$) is much more difficult and energy intensive than is the regeneration of magnesium sulfite. Thermal decomposition of magnesium sulfite can occur at temperatures as low as 600° F. By comparison, magnesium sulfate will not decompose significantly until it is heated to least 1950° F. The use of oxidation inhibitors makes the entire process more economical.

There are several advantages of the improved magnesium oxide dry scrubbing process, described by the present invention, over other flue gas desulfurization processes.

First, the present invention provides for the production of a salable product, such as $SO_2$, sulfur, or sulfuric acid that does not have to be disposed of in a landfill. Second, the present invention provides the ability to remove greater than 99% of the sulfur dioxide in a gas stream. Third, the present invention allows for the use of commercially available equipment. Fourth, the present invention allows for a smaller plot plan than wet scrubbers in that this process does not require a thickener, which wet scrubbers typically have. Fifth, the present invention does not require a water evaporation step as required in the wet magnesium oxide processes. Sixth, the flyash is separated prior to the spray dryer so that it can be sold or handled separately from the magnesium solids. Seventh, the regenerable process uses less reagent and produces less waste than other nonregenerable processes.

The present invention provides several advantages over known dry scrubbing processes such as the use of oxidation inhibitors to prevent the formation of sulfates in the $SO_2$ absorber. The goal of the present invention is to maximize sulfite ($SO_3^{-2}$) and minimize sulfate ($SO_4^{-2}$) formation because sulfates require more energy to release $SO_2$ than sulfites.

The present invention also uses a chloride purge stream from the system rather than a hydrogen chloride prescrubber prior to the spray dryer as disclosed by the known systems. This purge stream is from the freshly slaked magnesium hydroxide.

The present invention also recycles the recovered solids to increase the dissolved alkalinity in the form of $MgSO_3$ in the spray dryer feed. By comparison to the solubility of $MgSO_3$ (~12 grams per liter), magnesium hydroxide is nearly insoluble (~0.04 gram per liter). The reaction sequence where $SO_2$ absorbs into water and reacts with dissolved alkaline constituents such as $MgSO_3$ is much more rapid than the process by which $SO_2$ would react directly at the solid surface of the magnesium hydroxide after evaporation was complete. Therefore the present invention obtains higher sulfur dioxide removal levels.

The present invention uses a small slipstream sulfate and chloride removal step in order to purge the system of sulfates and chlorides, after the magnesium solids have been regenerated and slaked. Both magnesium chloride and magnesium sulfate are undesired compounds in the recycle stream that buildup in the process unless purged from the system. The magnesium value of the magnesium chloride can be effectively recovered by reaction with slaked lime or other alkalis such as soda ash or caustic.

While specific embodiments of the invention have been shown and described in detail to illustrate the application of the principles of the invention, it will be understood that the invention may be embodied otherwise without departing from such principles.

What is claimed is:

1. A method of cleaning a flue gas containing flyash, sulfur dioxide contaminants and other contaminants, the method comprising the steps of:
   positioning a first dust collector in a flue gas stream for receiving a flue gas and removing flyash therefrom;
   providing a slurry source having a slurry comprising water, an oxidation inhibitor, magnesium sulfite and magnesium hydroxide, the slurry source being connected to a spray dryer which is connected to the first dust collector downstream therefrom;
   spraying the flue gas in the spray dryer with the slurry for removing sulfur dioxide contaminants and for forming reaction products in the flue gas;

collecting the reaction products from the flue gas with a second dust collector connected to the spray dryer downstream therefrom;

providing a first portion of the reaction products to the slurry source;

providing a remaining portion of the reaction products to a calciner;

heating the remaining portion of the reaction products in the calciner at a temperature sufficient to decompose the remaining portion containing magnesium sulfite into sulfur dioxide and magnesium oxide, the calciner being heated at a temperature to decompose magnesium sulfite, one of the reaction products, and leave magnesium sulfate unaffected; and providing the magnesium oxide to the slurry source.

2. The method according to claim 1, wherein the slurry further includes a member selected from the group consisting of magnesium sulfate and magnesium chloride.

3. The method according to claim 1, including the step of purging magnesium sulfate and magnesium chloride from the slurry source after magnesium oxide is provided to the slurry source.

4. The method according to claim 1, including the step of converting the removed sulfur dioxide contaminants into sulfuric acid or sulfur.

5. The method according to claim 1, wherein the remaining portion of the reaction products is heated at a temperature of about 600° F.

6. The method according to claim 1, including the step of adding fresh magnesium oxide to the slurry source prior to the spraying step.

* * * * *